(No Model.)

G. W. NORTON.
AUTOMATIC WATER GATE.

No. 487,961. Patented Dec. 13, 1892.

WITNESSES:
J. C. Criswell
C. Sedgwick

INVENTOR
G. W. Norton
BY Munn & Co.
ATTORNEYS.

UNITED STATES PATENT OFFICE.

GEORGE W. NORTON, OF YUMA, ARIZONA TERRITORY.

AUTOMATIC WATER-GATE.

SPECIFICATION forming part of Letters Patent No. 487,961, dated December 13, 1892.

Application filed June 28, 1892. Serial No. 438,302. (No model.)

*To all whom it may concern:*

Be it known that I, GEORGE W. NORTON, of Yuma, in the county of Yuma and Territory of Arizona, have invented a new and Improved Automatic Waste-Gate, of which the following is a full, clear, and exact description.

My invention relates to improvements in automatic waste-gates such as are adapted to control the overflow wasteways or sluiceways of canals. Most canals are subjected to great test in the height of water, and when the water rises sufficiently to overflow the banks of the canal much damage is done both to the surrounding country and to the banks of the canal.

The object of my invention is to produce an automatic gate which may be applied to wasteways arranged in the desired locality in the banks of the canal and which will normally stay shut, but which when the water rises will automatically open, so as to permit the surplus water to escape, thus relieving the canal.

To this end my invention consists in certain features of construction and combinations of parts, as will be fully described hereinafter, and then pointed out in the claims.

Reference is to be had to the accompanying drawings, forming a part of this specification, in which similar figures of reference indicate corresponding parts in both the views.

Figure 1:
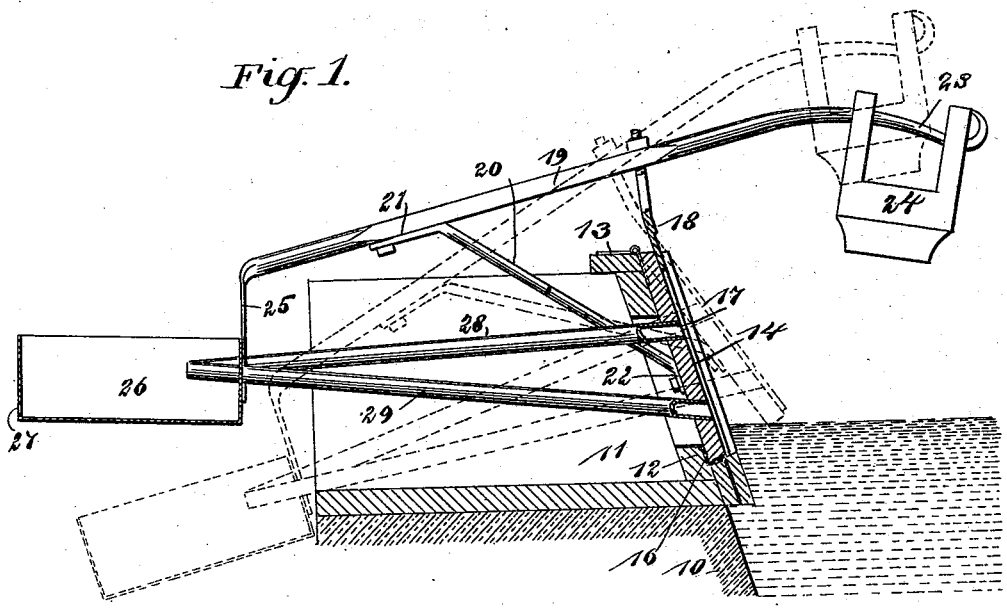
Figure 2:
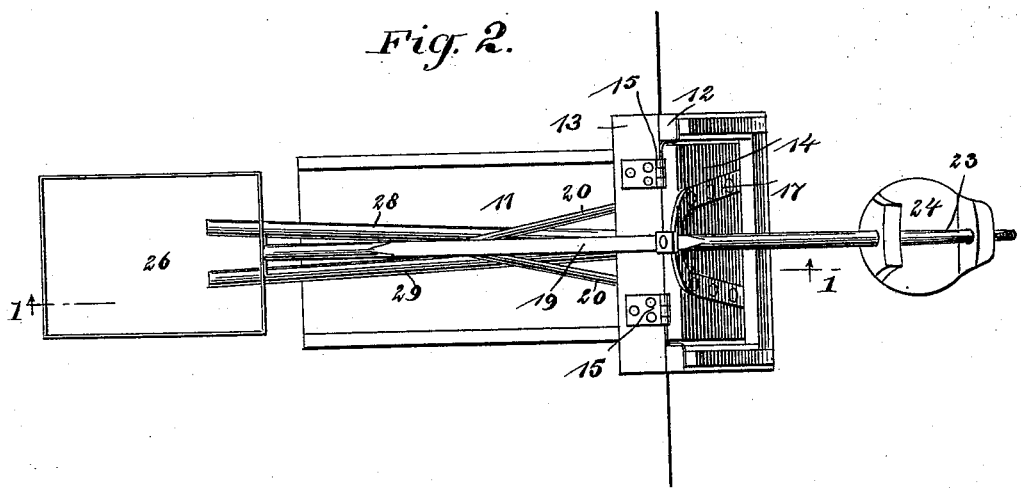

Figure 1 is a vertical section on the line 1 1 in Fig. 2, showing my improved gate; and Fig. 2 is a plan of the gate.

The bank 10 of the canal is provided at intervals and in proper places with wasteways and sluiceways 11, the entrances to which are closed by an open gate-frame 12, which has a cross-piece 13 at the top. A gate 14 is held to swing within the frame, the gate being hinged at the top to the cross-piece 13 by hinges 15, and the gate closes against suitably-packed shoulders 16 in the gate-frame. On the outer side or face of the gate 14 is an inverted-U-shaped brace 17, which terminates at its top in an upwardly-extending arm 18, to which is firmly secured a lever 19, which lever extends at right angles to the bank and hangs slightly over the canal. The lever has braces 20 secured thereto, the braces at their upper ends being flattened and firmly fastened to the lever, as shown at 21 in Fig. 1, and the lower ends of the braces diverge and are fastened to the lower portion of the gate 14. The outer end of the lever 19 is bent slightly downward, as shown at 23, and this end of the lever carries a counterbalance 24, sufficiently heavy to keep the gate 14 firmly shut under ordinary circumstances or at low water. The inner end of the lever 19 is bent sharply downward, as shown at 25, and to this is secured a tank 26, having an outlet 27 on one side and near the bottom. Leading into this tank at the same level are pipes 28 and 29, which pipes lead forward from the tank and open through the gate 14, the pipe 28 opening through the gate at a higher elevation than the pipe 29.

The operation of the gate is as follows: Under ordinary circumstances it will be closely shut and held shut by the counterbalance 24; but when the water rises in the canal above the pipe 28 the water will flow inward through the pipes 28 and 29 and into the tank 26. The capacity of the pipes 28 and 29 is greater than that of the outlet 27 of the tank 26, and consequently the tank soon fills, and as the weight of the full tank is greater than the weight of the counterbalance 24 the tank swings downward into the position shown by dotted lines in Fig. 1, thus moving the lever 19 and opening the gate 14, so that the water may escape through the wasteway 11. If the water is very high, it will continue to pass out through the lower pipe 29, and the tank 26 will be held down and the gate held open until the water in the canal is sufficiently lowered.

Having thus described my invention, I claim as new and desire to secure by Letters Patent—

1. The combination, with the wasteway opening from a body of water, of a vertically-swinging gate held at the mouth of the wasteway, a lever secured to the top of the gate and having a counterbalance at one end to close the gate, a tank secured to the opposite end of the lever, and pipes opening through the gate and adapted to deliver into the tank, substantially as described.

2. The combination, with a wasteway opening from a body of water, of a swinging gate to close the mouth of the wasteway, a lever secured to the gate, a counterbalance carried at one end of the lever and adapted to hold the gate shut, a tank secured to the opposite end of the lever and adapted when full to raise the counterbalance and open the gate, and pipes leading from the body of water and adapted to deliver into the tank, substantially as described.

3. The combination, with a wasteway opening from a body of water, of a vertically-swinging gate held to close the wasteway, a lever held to the gate-top and having at one end a counterbalance to close the gate and at its opposite end a tank, which when full will raise the counterbalance and open the gate, and pipes opening through the gate at different levels and held to deliver into the tank, substantially as described.

GEORGE W. NORTON.

Witnesses:
J. W. TORRINGTON,
D. K. ALLEN.